(12) United States Patent
Margulis et al.

(10) Patent No.: US 11,956,133 B1
(45) Date of Patent: Apr. 9, 2024

(54) NAVIGATOR PERFORMANCE OPTIMIZATION AND SIGNALFLOW QUERY ACCELERATION

(71) Applicant: SPLUNK Inc., San Francisco, CA (US)

(72) Inventors: Michael Margulis, Danville, CA (US); Bryan Browne Allen, Broomfield, CO (US); David Michael Scott, Boulder, CO (US); Junyu Wang, Walnut Creek, CA (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/846,466

(22) Filed: Jun. 22, 2022

(51) Int. Cl.
*H04L 43/067* (2022.01)
*H04L 41/02* (2022.01)
*H04L 43/0817* (2022.01)
*H04L 67/568* (2022.01)

(52) U.S. Cl.
CPC .......... *H04L 43/067* (2013.01); *H04L 41/024* (2013.01); *H04L 43/0817* (2013.01); *H04L 67/568* (2022.05)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,308,106 B1 * | 4/2022 | Muralimanohar | G06F 16/27 |
| 11,461,322 B1 * | 10/2022 | Plenderleith | G06F 16/2456 |
| 2006/0271510 A1 * | 11/2006 | Harward | G06F 9/52 |
| 2019/0034482 A1 * | 1/2019 | Werner | G06F 16/2393 |
| 2019/0098106 A1 | 3/2019 | Mungel et al. | |
| 2020/0218708 A1 * | 7/2020 | Håkansson | G06F 16/2272 |
| 2022/0075761 A1 * | 3/2022 | Novotny | G06F 16/2282 |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.

(Continued)

*Primary Examiner* — Clayton R Williams
(74) *Attorney, Agent, or Firm* — Kilpatrick Townsend & Stockton LLP (57) ABSTRACT

Described are techniques for accelerating streaming analytics jobs, which may be used for generating dashboards. The disclosed techniques can reduce overhead, such as in the form of processor usage, network usage, or the like, due to duplicative or overlapping requests for streaming analytics data by implementing a caching process in which analytics data is evaluated to determine if it is likely to be requested multiple times or by multiple users, caching the analytics data, and serving future requests for the same analytics data from the cache instead of requiring separate analytics jobs for each request.

20 Claims, 4 Drawing Sheets

(56) References Cited

OTHER PUBLICATIONS

Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

FIG. 4

NAVIGATOR PERFORMANCE OPTIMIZATION AND SIGNALFLOW QUERY ACCELERATION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, machine data may be generated by software or based on hardware parameters associated with a computing system on which the software is operating (e.g., processor usage). For example, machine data can include log data, performance data, diagnostic data, metrics, tracing data, or any other data that can be analyzed to diagnose equipment performance problems, monitor user interactions, and to derive other insights.

Monitoring certain machine data in real-time or near real-time may be desirable for some applications. For example, it may be useful to monitor performance data or metrics, such as processor usage or memory usage, in real-time to allow for identification of problems as they occur. Tracking machine data in real-time or over various time periods (e.g., hours, days, weeks, months) can also allow for identification of patterns and can be useful for scaling resources, for example. In some cases, it can be useful to consolidate or compile machine data generated in real-time (e.g., every second) over longer periods (e.g., minutes, hours, days, etc.) to allow for easier visualization and interpretation or analysis of the machine data.

BRIEF DESCRIPTION OF THE DRAWINGS

Illustrative examples are described in detail below with reference to the following figures.

DETAILED DESCRIPTION

Techniques, which may be embodied herein as systems, computing devices, methods, algorithms, software, code, computer readable media, or the like, are described herein for accelerating streaming analytics jobs, which may be used for generating dashboards, Navigator views, or SignalFlow programs or outputs, for example. The disclosed techniques can reduce overhead, such as in the form of processor usage, network usage, or the like, due to duplicative or overlapping requests for streaming analytics data by implementing a caching process, system, and/or policy in which analytics data is evaluated to determine if it is likely to be requested multiple times and/or by multiple users and caching the analytics data for serving future requests for the same analytics data from the cache instead of requiring separate analytics jobs for each request.

It will be appreciated that the above described aspects may be implemented as methods, systems, computing devices, and/or non-transitory computer readable media. For example, a system or computing device may comprise one or more processors and a non-transitory computer-readable storage medium having stored thereon instructions that, when executed by the one or more processors, may cause the one or more processors to perform operations, such as operations corresponding to methods described herein. In another example, a non-transitory computer-readable storage medium may comprise or have stored thereon instructions that, when executed by the one or more processors, may cause the one or more processors to perform operations, such as operations corresponding to methods described herein.

The term embodiment and like terms are intended to refer broadly to all of the subject matter of this disclosure and the claims below. Statements containing these terms should be understood not to limit the subject matter described herein or to limit the meaning or scope of the claims below. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim. Other objects and advantages will be apparent from the below detailed description including non-limiting examples.

Embodiments described herein are useful for analyzing, visualizing, organizing, or otherwise using machine data, such as for purposes of determining the state or condition of a system. For example, machine data can be raw machine data that is generated by various components in IT environments, such as servers, sensors, routers, mobile devices, Internet of Things (IoT) devices, etc. Machine data can include log data, network packet data, sensor data, application program data, error log data, stack trace data, performance data, metrics, tracing data, diagnostic data, and many other types of data.

The machine data may be organized as time series data, where each data point may have or be associated with one or more times or timestamps, such as a raw time, a receipt time, a publication time, etc., one or more values, such as a numerical measurement that can change over time (e.g., processor usage, network latency, total transactions or transactions per unit time, etc.), and optionally metadata, such as one or more identifiers, dimensions, tags, labels, or other custom properties that may indicate characteristics of or associated with the data that may or may not change over time (e.g., a metric name or metric type of the data point, a server IP address or hostname, etc.). In some implementations, a set of time series data associated with the same metric name and dimensions may be referred to as a metric time series or MTS. Metric time series and other time series data may be used for various applications, such as for identification of patterns or anomalies.

In some examples, it may be desirable to monitor multiple streams of time series data from multiple sources and aggregate or transform the data, such as for purposes of alerting or triggering on the aggregated or transformed data or to visualize the aggregated or transformed data, such as to evaluate anomalies, understand patterns, or alter resource usage, for example. In some examples, transformed or aggregated time series data, optionally from multiple sources or at multiple time resolutions, may be referred to herein as analytics data, which may be in the form of a data stream, as additional time series data may be generated over time and used to generate additional aggregated or transformed data over time. Charts and detectors can be established for visualizing, alerting, or triggering based on the analytics data.

In some cases, users may experiment with charts and settings for the charts (e.g., resolution) without narrowing certain dimensions, such as time. This might result in long running times for analytics jobs used to generate the analytics data from the source time series data. User experimentation may be an iterative process, which can result in running the same, or only slightly varied, analytics jobs multiple times. In the case of anomaly detection, which may trigger an alert that can be sent to multiple users, the multiple users may all attempt to investigate the anomaly at the same or about the same time, and request or generate visualizations of the analytics data that triggered the alert, or related analytics data, during their investigations. Such a situation may result in each user session triggering separate analytics jobs, which may result in all users having to wait for their respective analytics jobs to execute before their visualizations can be generated, despite that each user may be requesting the same analytics data.

The techniques described herein allow for selective caching of analytics data for analytics jobs that may be repeated, which can reduce overhead, such as in the form of processor usage, network usage, or the like, due to duplicative or overlapping requests. Such techniques can improve user experience and reduce waiting times, as the cached analytics data can be sent without having to wait for execution of the analytics job. In many cases, execution of an analytics job is often be the bottleneck or longest process that needs to complete before the analytics data can be visualized. Eliminating repeated analytics jobs can further reduce processing associated with performing the analytics job and also reduce transmission of data over at least a portion of a network, such as including multiple analytics job requests and multiple responses with the same analytics data.

The techniques described herein can employ a policy-based caching process in which requests for analytics data can be evaluated to determine if the request is repeated or if responsive analytics data for the request has already been or is already being cached, and quickly providing the cached data in response to the request. In the case of multiple requests for streaming analytics data, where receipt of additional responsive data is ongoing, streaming data from a single streaming analytics job can be forwarded as individual responses to the multiple requests, limiting the backend overhead associated with performing the same streaming analytics job multiple times at the same time. When evaluating a request for analytics data, the request can be evaluated to determine if it is likely that the responsive analytics data will be requested multiple times and to cache the analytics data when appropriate.

1.0. Data Stream Quantization

Figure 1:
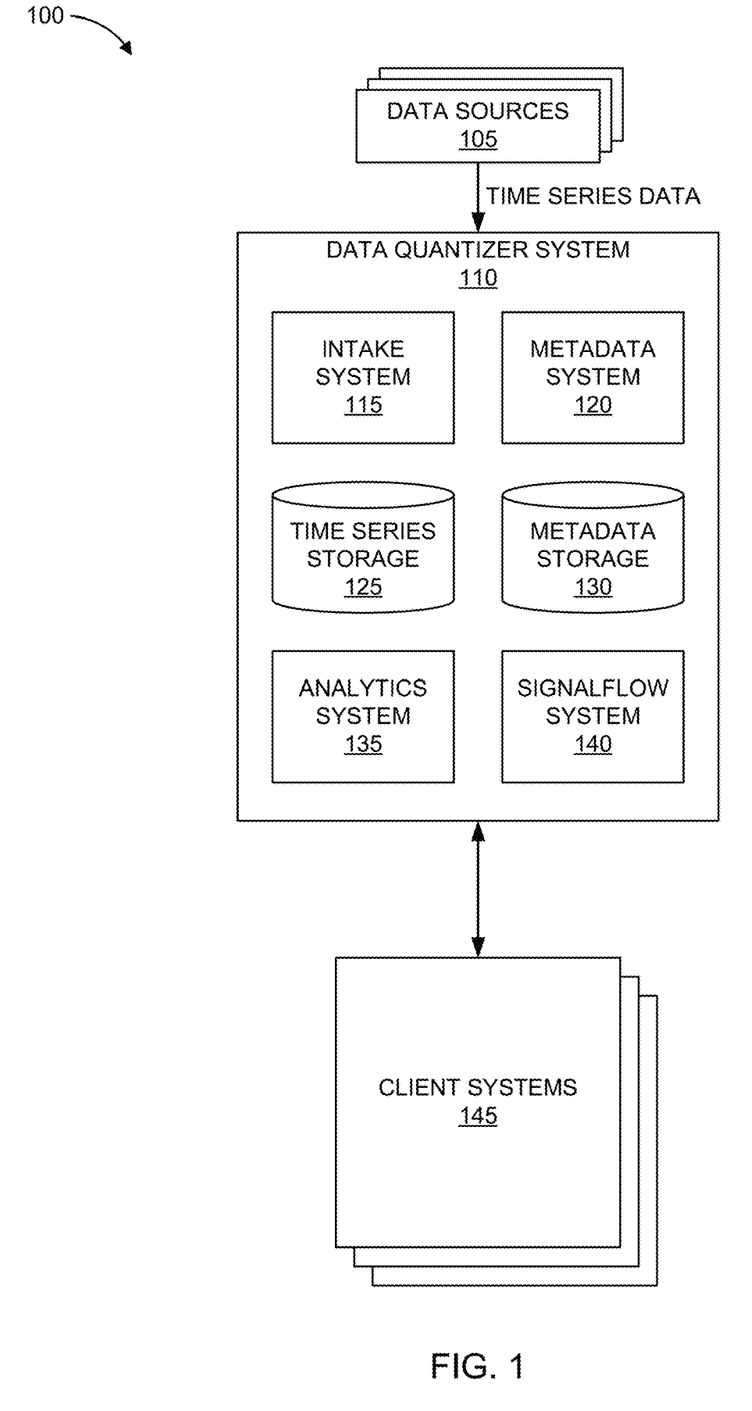
FIG. 1 provides a block diagram of an embodiment of an environment for collecting, analyzing, processing, and storing time series data.

FIG. 1 shows an overview of an example environment 100 for collecting, analyzing, processing, and storing time series data (e.g., metric time series data). Time series data may be generated in real time by various data sources 105, which may be distributed across various networks. These data sources 105 may transmit the time series data to a data quantizer system 110, such as over a network, which may include a private network, a wide area network, or a public network (e.g., the Internet). In some cases, the data quantizer system 110 may be at a location remote from the data sources 105, though in some cases the data quantizer system 110 and one or more data sources 105 may be at a common location, and optionally on the same local network. The time series data may include data points that are generated on a repeated basis, which may be a periodic basis (e.g., every second, every minute, etc.) or on a non-periodic basis (e.g., when a generation threshold is reached, upon system reboot, etc.). As illustrated, the data quantizer system 110 may include various subsystems or components, such as an intake system 115, a metadata system 120, a time series storage 125, a metadata storage 130, an analytics system 135, and a signalflow system 140. These and other components of the data quantizer system 110 may be present as or in a single computing system or may be separate and individually distributed components among a distributed computing system, including where the different components may be physically present in separate locations.

The data sources 105 may be or comprise any suitable computing devices, sensors, software systems, etc., that can generate or collect machine data or other data and transmit the machine data or other data in the form of time series data to the data quantizer system 110, such as over one or more network connections. The data sources 105 can include hosted or containerized software or services operating on cloud infrastructure, where computing resources are shared between multiple hosted software or services. The data sources 105 can be present in a single location or data center or distributed among various data centers, which may be located remotely from one another.

The time series data generated by the data sources 105 may include one or more data points. Each data point can be associated with a raw time that can correspond to a timestamp indicating when a data point is generated by a data source 105, a time at which a data point is transmitted by a data source 105, and/or some other time assigned to the data point by the data source 105.

The data quantizer system 110 may ingest or intake the time series data using the intake system 115. The intake system 115 can receive the time series data from the data sources 105 and assign a receipt time to the data points in the time series data based on a time at which the data points are received, which is generally different from the raw time associated with the data points, since there is usually some latency associated with transmitting the data point to the data quantizer system 110 over a network. In some cases, however, a raw time and a receipt time may be the same, such as if network latency is low and/or if the precision of the raw time and/or receipt time is larger than the network latency (e.g., when the raw time and the receipt time have a precision of 1 second and network latency is less than 100 ms). The intake system 115 may remove extraneous information from the time series data, as desired, and may adjust or format the time series data to a standard format used by the data quantizer system 110, if not already so formatted.

The metadata system 120 may optionally create or assign metadata (e.g., identifiers, dimensions, tags, labels, or the like), to the data points, such as if such metadata is not already assigned or present in the data points or if the metadata system 120 is otherwise assigned to or has rules indicating such metadata is to be assigned. The metadata system 120 may retrieve from or store metadata information to metadata storage 130. Optionally, metadata storage 130 may store an index or rules for associating various metadata with various time series data or components thereof.

Although not shown in FIG. 1, a roll-up system may process received data points so as to transform the data values in the received data points to roll-up data points including quantized values associated with one or more regular time intervals. The regular time intervals may be as small as time intervals associated with the received data points but may also be larger, such that multiple values for multiple data points can be combined to generate a quantized value. For example, the received data points may be associated with a time interval of 0.1 seconds, such that 10 data points are received by data quantizer system 120 each second; the roll-up data points may be generated for every 1 second, every 5 seconds, every 15 seconds, every minute, etc., on an ongoing basis. Assuming all data points are received and included in the combination for generating roll-up data points, each 1 second roll-up data point may have a quantized value generated from values for 10 data points. Similarly, each 5 second roll-up data point may have a quantized value generated from values for 50 data points, each 15 second roll-up data point may have a quantized value generated from values for 150 data points, and each minute roll-up data point may have a quantized value generated from values for 600 data points. When combining values from multiple data points to generate a quantized value for a roll-up data point, any desirable technique may be used. In some cases, the quantized value may correspond to a sum of the data values. In some cases, the quantized value may correspond to a statistical measure of the data values, such as an average or standard deviation. In some cases, a formula or algorithm may be used for computing quantized values from a plurality of data values.

Without limitation, time series data may be stored to time series storage 125, such as by intake system 115 or by another system, such as a roll-up system, which may store the time series data in the form of roll-up data to time series storage 125.

In some cases, it may be desirable to transform, combine, or associate different time series with one another, such as for various analytics purposes. Analytics system 135 may be used to generate, aggregate, transform, or otherwise combine data from one or multiple different time series to generate analytics data (e.g., a time series of transformed, aggregated, or combined time series data that may optionally be grouped over a common attribute, such as a metadata attribute). Optionally, the time series used by the analytics system 135 to generate analytics data may include roll-up data points as generated using a roll-up system, as described above. In some examples, one time series may include data points with values for processor usage for a particular processor core and a second time series may include data points with values for processor usage for another processor core, and it is desired to determine an overall total or average processor core usage. As another example, multiple time series (e.g., including roll-up data at a fixed time interval) may include data points for processor usage for various processors in a particular data center and it may be desired to have a time series including an overall total or average processor usage for the data center. The analytics system 140 can identify the time series that include metadata identifying the particular data center and determine a sum or average of the processor usage for all the identified time series on a per time interval basis to generate analytics data comprising an aggregated time series representing the overall total or average processor usage for the data center. In some examples, the analytics system 135 may optionally receive input or an analytics data request identifying a particular transformed, combined, or aggregated time series to generate and then generate appropriate analytics data in response.

As time series data from data sources 105 is received by data quantizer system 110 on a continuing basis, the intake system 115, metadata system 120, and/or analytics system 135 may perform the above-described aspects repeatedly and optionally in real-time as additional data points are received.

The signalflow system 140 can be used to facilitate visualizing and monitoring conditions, time series data (optionally including quantized into roll-up data points by the data quantizer system), and/or other machine data associated with or generated by the various data sources 105, such as in the form of analytics data. In some cases, the signalflow system 140 can enable identification of problems, errors, or undesired performance associated with one or more of the data sources 105 in real-time or near real-time, allowing for troubleshooting and resolution of such issues while minimizing downtime. For example, the time series data may comprise a processing load on each of the data sources 105, such as data sources that correspond to a plurality of servers distributed across a plurality of data centers. The signalflow system 120 can enable correlation and visualization of analytics data representing different servers in different data centers, for example, and such processing usage on a per-data center basis can be monitored or explored, for example, by one or more users associated with client systems 145.

The signalflow system 140 may provide analytics data to software applications executing on client systems 145 that permits users to interact with the analytics data, such as for purposes of selection of time series data to be included in the analytics data (e.g., based on a metadata filtering query) or to visualize the analytics data, specification or assignment of metadata, identification of alert conditions or triggers, on-demand report generation, selection of automatic report generation based on trigger or threshold conditions, or the like. In some embodiments, the software application can be an internet browser, which may include client side code (e.g., Java Script) for accessing the data quantizer system 120. In some embodiments, the software application is a proprietary application developed for interacting with the data quantizer system 120.

2.0. Caching of Analytics Data for Repeated Requests

Figure 2:
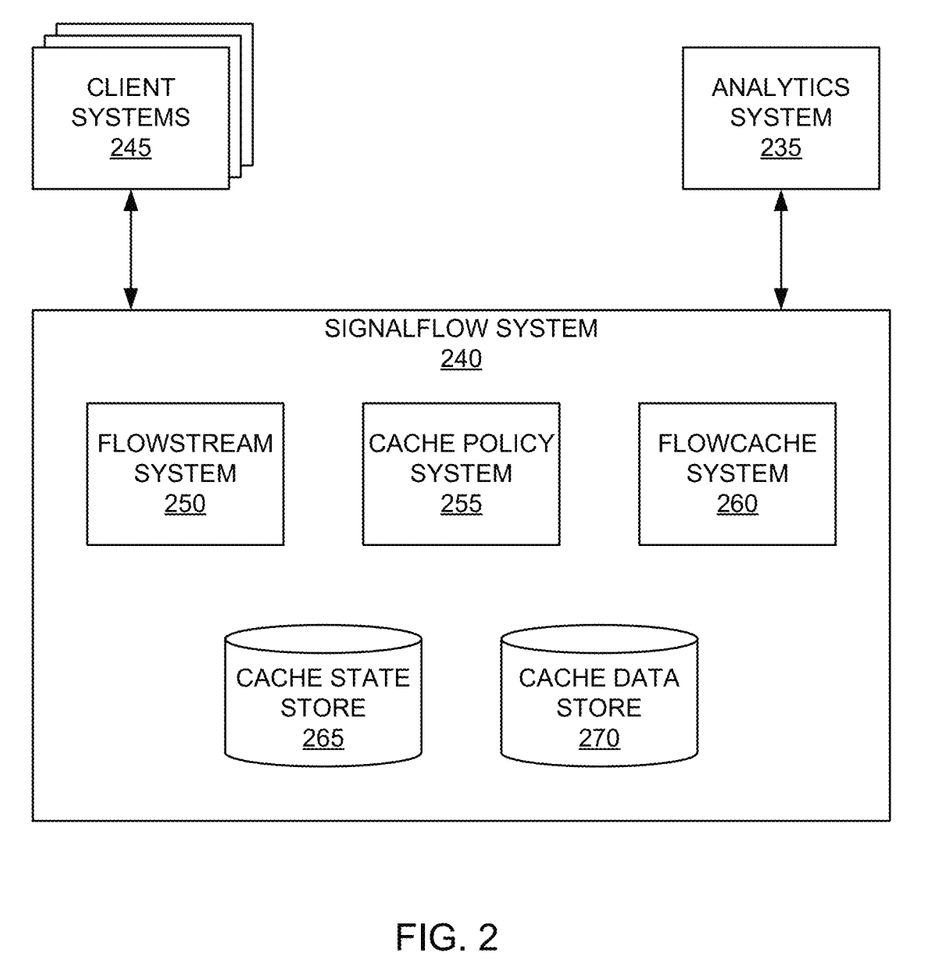
FIG. 2 provides a block diagram of an example signalflow system.

Data quantizer systems can include a signalflow system to negotiate receiving analytics data requests from client systems and providing the resulting analytics data to the client systems, such as for purposes of visualization, as described above. FIG. 2 show an overview of a portion 200 of an example environment, such as for collecting, analyzing, processing, storing, and/or visualizing time series data. Specifically, FIG. 2 shows a signalflow system 240 providing an interface between client systems 245 and analytics system 235. Signalflow system 240 may be the same as or different from signalflow system 140 depicted in FIG. 1. Client systems 245 may be the same as or different from client systems 145 depicted in FIG. 1. Analytics system 245 may be the same as or different from analytics system 145 depicted in FIG. 1.

Signalflow system 240 comprises a flowstream system 250, a cache policy system 255, a flowcache system 260, a cache state store 265, and a cache data store 270. From the perspective of the client systems 245, analytics data requests are sent to signalflow system 240 and analytics data streams are received from signalflow system 240 at client systems 245 in response to such requests. From the perspective of signalflow system 240, analytics data requests are received at flowstream system 250 and flowstream system 250 returns analytics data to client systems 245. In this way, flowstream system 250 acts as an interface with analytics system 235 for client systems 245 and so the use of the caching techniques described herein is transparent to client systems 245, meaning no programmatic changes may be needed at client systems 245 for use of the disclosed techniques.

Within signalflow system 240, requests for analytics data are received at flowstream system 250, which then interacts with cache policy system 255 and flowcache system 260 to obtain the analytics data from analytics system 235, and store the received analytics data at the cache data store 270 if caching of the analytics data is appropriate (e.g., triggered according to cache policies identified at cache policy system 255). The cache state store 265 can be useful for storing received analytics requests or other information which may be useful by flowstream system 250 and/or flowcache system 260 to determine if caching of the analytics data is needed or appropriate or if analytics data for responding to a request is already stored by the cache data store 270.

Flowstream system 250 and/or cache policy system 255 may, for example, evaluate received requests for analytics data from client systems 255 to determine if the requests for analytics data have been received previously, if the data responsive to the requests for analytics data is to be stored by cache data store 270, or if cache data store 270 already stores responsive data. In some examples, the received requests may optionally be evaluated by hashing the request, storing the resultant hash (e.g., in the cache state store 265), and/or comparing the resultant hash with other hashes for previously received requests, which may optionally be stored in cache state store 265. In some examples, other parameters associated with the request may optionally be evaluated, such as a start time, an end time, and/or a time range for the request and/or a resolution associated with the request (e.g., a resolution of the requested analytics data or the associated time series data). For example, if analytics data responsive to the request falls in a time range that is a subset of already cached analytics data, the data may be considered to be already cached. In another example, if analytics data responsive to the request falls in a time range that is completely or at least partially outside of already cached analytics data, the data may not be considered to be cached. Optionally, if the resolution of the analytics data is the same as or more coarse than the resolution of already cached analytics data, the data may not be considered to be cached. Optionally, if the resolution of the analytics data is different from or more fine than the resolution of already cached analytics data, the data may not be considered to be cached.

For cases where analytics data responsive to a request received at flowstream system 250 is not cached, flowcache system 260 may transmit a request for analytics data to analytics system 235. In some cases, flowstream system 250 or cache policy system 255 may trigger or otherwise direct flowcache system 260 to transmit such a request, such as automatically after determining that the responsive analytics data is not already stored in cache data store 270. The analytics data responsive to the request may be returned by analytics system 235 to flowcache system 260. For requests identified by flowstream system 250 and/or cache policy system 255 for which the responsive data is to be cached, flow cache system 260 can direct the data to cache data store for 270 for storage. If the request is not identified as triggered for caching, flow cache system 260 may not direct the data to cache data store 270 for storage. In either event, the responsive analytics data received at flow cache system 260 from analytics system 235 can be forwarded to flowstream system 250 for communication to the client system 245 in response to the original request received from the client systems 245.

In the case of receiving a request from a client system 245 at flowstream system 250 where responsive analytics data is already stored by cache data store, the flowstream system 250 and/or cache policy system 255 can identify the request as such and direct the flowcache system to obtain the responsive data from cache data store 270, which may be provided to flowstream system 250 and returned to the client system 245.

If the responsive data is being received on an ongoing basis at flowcache system 260 (e.g., where some cached data before a particular point in time may already be stored by cache data store 270 but new or additional streaming analytics data after the particular point in time is received at flowcache system 260 from analytics system 235 on an ongoing basis) such as due to a previous analytics data request, the flowcache system 260 can obtain responsive data stored by cache data store 270 and forward to flowstream system 250 and indicate that additional responsive data in the form of streaming analytics data may be in an existing data stream (e.g., containing the additional streaming analytics data is received at flowcache system 260 from analytics system 235 on an ongoing basis), which may result in or be similar to attaching or subscribing a new client system 245 to an existing analytics data stream.

The cache policy system 255 may thus serve to identify requests as being cacheable or not and being cached or not and provide instructions, signals, or flags to flowstream system 250 and/or flowcache system 260 to request and/or cache certain analytics data and to attach client systems to a stream of analytics data. Cache policy system 255 and/or flowstream system 250 may track the requests received from various client systems 245 and may identify when different client systems 245 request the same data, and thus become attached to an existing stream of analytics data, or disconnect, stop, or complete receiving a stream of analytics data.

In some cases, cache policy system 255 may identify certain analytics data stored at cache data store 270 for removal (e.g., eviction or deletion) from cache data store 270. In some examples, if all client systems 245 disconnect, stop, or complete receiving a particular set or stream of analytics data that is stored by the cache data store 270, the cache policy system 255 may direct flowcache system 260 to delete the particular set or stream of analytics data from the cache data store 270. In some cases, the cache policy system 255 may coordinate or direct removal the of the particular set or stream of analytics data from the cache data store 270. In some examples, all or a portion of a particular set or stream of analytics data that is stored by the cache data store 270 may be automatically triggered for removal, such as based upon a time or a duration. For example, all or a portion the particular set or stream of analytics data that is stored by the cache data store 270 may be automatically triggered for removal after a set period of time or after a set period of time after all client systems disconnect, stop, or complete receiving the particular set or stream of analytics data. In some examples, the removal may include removing analytics data having an associated timestamp that is older than a particular threshold value.

The present embodiments provide for a dynamic caching system that can store frequently used analytics data, reducing redundant requests for the same analytics data, improving user experience by reducing waiting times at some or most client systems for the analytics data. The signalflow systems described can efficiently request, obtain, cache, and/or serve analytics data to different client systems in a way that may be transparent to client systems. By caching and providing cached analytics data to client systems, network data transmissions can be reduced, such as between a signalflow system and an analytics system. Caching of analytics data in this way can further reduce processor usage and overhead at the analytics system, since repeated requests for analytics data can be served from the cache in a signalflow system rather than using the analytics system to prepare and send the same analytics data multiple times.

3.0. Example of Analytics Data Caching in a Signalflow System

Figure 3:
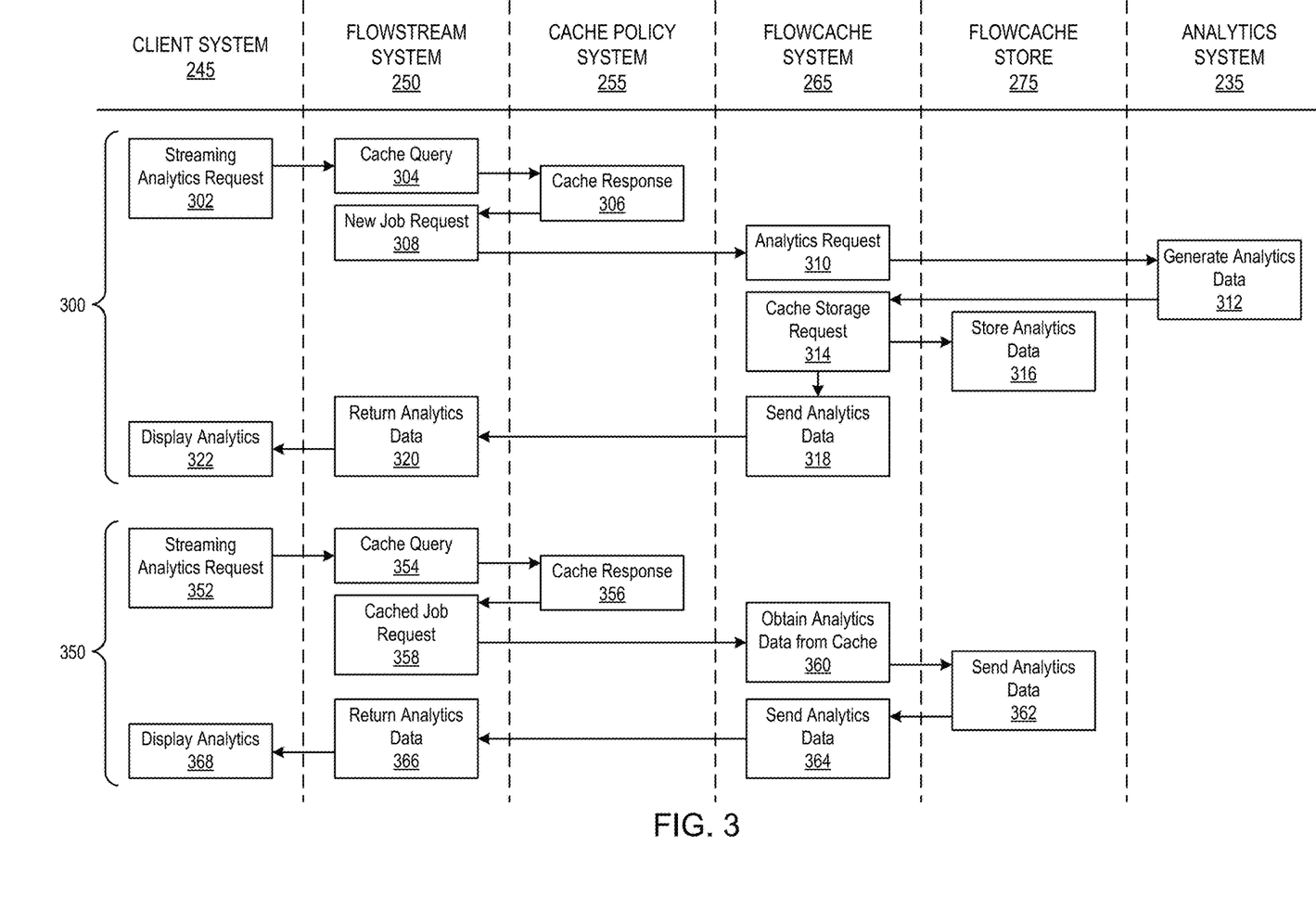
FIG. 3 provides a diagram showing communications between systems for examples of storing analytics data received for an analytics job to a cache store and retrieving analytics data from a cache store for an analytics job.

As described above, caching of analytics data can be performed to reduce overhead, network congestion, and reduce delays associated with receiving analytics data at client systems. FIG. 3 provides an example showing communication between components in a signalflow system, such as signalflow system 240, for receiving requests for analytics data from client systems and providing responsive analytics data, which may be stored in a flowcache store.

FIG. 3 shows a first example 300, where analytics data responsive to a streaming analytics request 302 is not stored by a flowcache store 275, and so the analytics data is obtained from an analytics system 235. Initially, a client system 245 generates a streaming analytics request 302, which is transmitted to the signalflow system and received at flowstream system 250. Flowstream system 250 may generate a cache query 304, which may be transmitted to cache policy system 255. Cache query 304 may optionally include information included in or derived from the streaming analytics request 302, such as one or more of a hash of or associated with the streaming analytics request 302 or a portion thereof, a start time for the analytics data, an end time for the analytics data, or a requested resolution for the analytics data. Optionally, the cache policy system may evaluate the cache query 304, such as the information included in or derived from the streaming analytics request 302, to determine if responsive data is stored by the flowcache store 275. In some examples, the cache policy system 255 may generate derived information from the streaming analytics request 302 (e.g. a hash) or such derived information may be provided to the cache policy system 255 as part of the cache query 304. The cache policy system 255 may, for example, compare information from or derived from the streaming analytics request 302 with similar previously received or derived information from other streaming analytics requests.

In example 300, the cache policy system may use information from the cache query 304 to determine that analytics data responsive to the streaming analytics request 302 is not stored by the flowcache store 275 and may generate a cache response 306, providing an indication that such responsive data is not stored or that a new analytics job is needed to obtain the responsive analytics data. In some examples, the cache response 306 may optionally provide an indication of whether the responsive analytics data should be stored by the flowcache store 275.

The cache response 306 may be received at flowstream system 250, which may use such response to generate a new job request 308. The new job request may include all or a portion of the streaming analytics request 302 and optionally other information. For example, in example 300, the new job request 308 may include information indicating that the responsive analytics data should be stored by the flowcache store 275. The new job request 308 may be transmitted to and received at the flowcache system 265, which may trigger the flowcache system to generate an analytics request 310. The analytics request 310 may be transmitted to and received at the analytics system 235.

The analytics system 235, responsive to receiving the analytics request, may compile, assemble, or otherwise generate the analytics data 312 responsive to the streaming analytics request 302. In some examples, the responsive analytics data may be a completed data set in which no new data points are to be generated. In other cases, however, the responsive analytics data may be a streaming data set in which additional responsive analytics data can be generated in real-time, or near-real-time, as new time series data points are generated by various data sources. The analytics data responsive to the streaming analytics request 302 can be transmitted by analytics system 235 and received by flowcache system 265.

Flowcache system 265 can then, if appropriate, take action to store the analytics data to the flowcache store. For example, as illustrated in example 300, the flowcache system 265 can perform a cache storage request 314, where the analytics data is transmitted to the flowcache store 275 to store the analytics data 316 thereon. As noted above, a trigger, flag, or other signal indicating that the analytics data responsive to the streaming analytics request 302 can be received at the flowcache system 265, such as in or accompanying the new job request 308.

Before, simultaneous with, or after generating a cache storage request 315, the flowcache system 265 can also send the analytics data 318 to the flowstream system 250, which can subsequently return the analytics data 320 the client system 245. In some examples, the client system can generate or cause a display of the analytics 322, such as representing or derived from the analytics data.

FIG. 3 also shows a second example 330, where analytics data responsive to a streaming analytics request 352 is stored by a flowcache store 275, and so the analytics data is obtained from the flowcache store 275 instead of from the analytics system 235. Initially, a client system 245 generates a streaming analytics request 352, which is transmitted to the signalflow system and received at flowstream system 250. Flowstream system 250 may generate a cache query 354, which may be transmitted to cache policy system 255. In this example 350, the cache policy system may use information from the cache query 304 to determine that analytics data responsive to the streaming analytics request 302 is stored by the flowcache store 275 and may generate a cache response 356, providing an indication that such responsive data is stored or that a new analytics job is not needed to obtain the responsive analytics data. In some examples, the cache response 356 may optionally provide information other analytics data streams including the responsive analytics data that are already being transmitted by the flowstream system 250. In such a case, the analytics data responsive to the streaming analytics request 302 that is stored by the flowcache store 275 may correspond to historical analytics data, such as received prior to receipt of the streaming analytics request 352 at the signalflow system.

Upon receipt of the cache response 356 at the flowstream system 250, a cached job request 358 may be generated and transmitted to the flowcache system 265. The cached job request may include all or a portion of the streaming analytics request 352 and/or other information indicating which data stored by flowcache store 275 is responsive to the streaming analytics request 352. Receiving the cached job request 358 at the flowcache system 265, may trigger the flowcache system to obtain analytics data from the cache 360. The flowcache store 275 may then send the analytics data 362 to the flowcache system 265.

Flowcache system 265 can then send the analytics data 364 to the flowstream system 250, which can subsequently return the analytics data 66 the client system 245. In some examples, the client system can generate or cause a display of the analytics 368, such as representing or derived from the analytics data.

Figure 4:
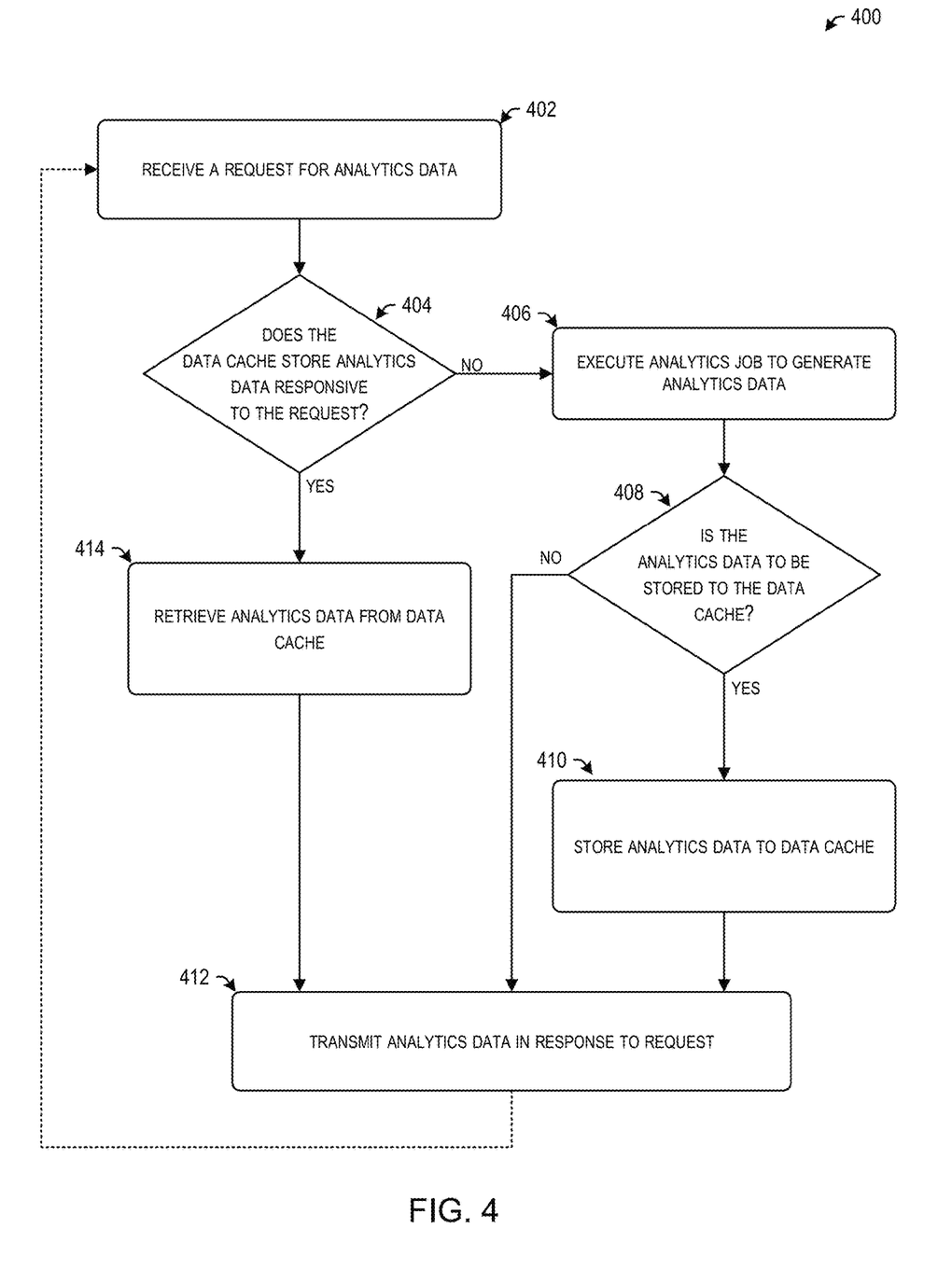
FIG. 4 provides an overview of an example process for obtaining and transmitting analytics data in response to receiving a request for the analytics data.

Turning next to FIG. 4, a flow chart providing an overview of an example method 400 is shown. Method 400 may correspond to a process performed by a signalflow system, such as signalflow system 140 or signalflow system 240. Method 400 begins at 402, where a request for analytics data is received. As described above, request for analytics data may include various information, such as specifying which analytics data is requested, a start time for the request, an end time for the request, a resolution for the analytics data, or other information that can be used by the signalflow system to determine the responsive data and that can be used by an analytics system, such as analytics system 135 or analytics system 235, to generate, assemble, or otherwise prepare the responsive analytics data.

At 404, the signalflow system can determine if a data cache in the signalflow system stores analytics data responsive to the request. As described above, determining whether the data cache in the signalflow system stores analytics data responsive to the request can include comparing the request, a portion of the request, or data derived from the request or a portion thereof with other information from or derived from a previously received request. For example, a hash of the request (or a portion thereof), can be compared with a hash of a previous request (or a portion thereof). Optionally, start and end times of the request and previous requests can be compared. Optionally, a data resolution for the request and the previous requests can be compared.

If it is determined that the data cache does not store analytics data responsive to the request, method 400 may proceed to 406, where an analytics job to generate the analytics data can be executed or triggered. For example, the signalflow system can forward the request for analytics data to an analytics system, such as analytics system 135 or analytics system 235, to generate, assemble, or otherwise prepare the responsive analytics data.

At block 408, the signalflow system can determine if the analytics data is to be stored to the data cache in the signalflow system. For example, the signalflow system can evaluate characteristics about the analytics job, such as the type of analytics data requested, whether other requests for the same or similar analytics data have been received previously, whether the responsive analytics data is likely to be requested again, or the like, to determine if the analytics data is to be stored to the data cache. If it is determined that the analytics data should be stored to the data cache, method 400 may proceed to 410, where the analytics data is stored to the data cache. For example, the signalflow system may store the responsive analytics data to a cache data store, such as cache data store 270. Method 400 may also proceed to 412 where the analytics data is transmitted, such as to the client system, in response to the request received at 402. If it is determined that the analytics data should not be stored to the data cache, method 400 may proceed directly to 412, where the analytics data is transmitted, such as to the client system, in response to the request received at 402.

If it is determined that the data cache does store analytics data responsive to the request, method 400 may proceed from 404 to 414, where the analytics data is retrieved from the data cache. For example, a flowcache system (e.g., flowcache system 260) of the signalflow system can obtain the analytics data from a data cache (e.g., cache data store 270). Method 400 may then proceed to 412 where the analytics data is transmitted, such as to the client system, in response to the request received at 402.

It will be appreciated that aspects of method 400 may be repeated, either sequentially or simultaneously, as indicated by the dashed line from 412 to 402, where additional requests for analytics data can be received to either obtain the responsive analytics data from a data cache or to execute a new analytics job to generate the responsive analytics data.

4.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. § 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
   receiving a first request for a first analytics data;
   determining that an analytics data cache does not store analytics data responsive to the first request;
   executing a first analytics job to generate the first analytics data responsive to the first request, such that the first analytics data is generated after receiving the first request for the first analytics data, wherein the first analytics data comprises streaming analytics data responsive to the first request;
   storing the first analytics data in the analytics data cache;
   transmitting the first analytics data in response to the first request;
   receiving a second request for a second analytics data;
   determining that the analytics data cache stores the second analytics data responsive to the second request, the second analytics data corresponding at least partly to the first analytics data;
   retrieving the second analytics data from the analytics data cache; and
   transmitting the second analytics data in response to the second request.

2. The computer-implemented method of claim 1, wherein retrieving the second analytics data occurs without executing an additional analytics job to obtain new analytics data responsive to the second request.

3. The computer-implemented method of claim 1, wherein the first analytics job:
   provides historical analytics data responsive to the first request and having times up to a first time associated with the first request; and
   provides the streaming analytics data responsive to the first request and associated with times after the first time.

4. The computer-implemented method of claim 3, wherein transmitting the second analytics data includes transmitting at least a portion of the historical analytics data and at least a portion of the streaming analytics data.

5. The computer-implemented method of claim 3, wherein at least a portion of the streaming analytics data is transmitted in response to the second request prior to or concurrent with storing the streaming analytics data to the analytics data cache.

6. The computer-implemented method of claim 1, further comprising logging the first request and the second request, or a portion or a parameter thereof, to a cache state database.

7. The computer-implemented method of claim 1, wherein determining that the analytics data cache stores analytics data responsive to the second request includes comparing the second request to the first request to determine one or more parameters of the second request overlap with or are the same as one or more parameters of the first request.

8. The computer-implemented method of claim 1, further comprising:
   removing analytics data stored in the analytics data cache after a predetermined time period.

9. The computer-implemented method of claim 1, further comprising,
   receiving a third request for a third analytics data;
   determining that the analytics data cache stores insufficient analytics data responsive to the third request;
   executing a new analytics job to obtain the third analytics data responsive to the third request; and
   transmitting the third analytics data in response to the third request.

10. The computer-implemented method of claim 9, further comprising:
    evaluating a caching policy for the third request to trigger storing the third analytics data in the analytics data cache; and
    storing the third analytics data in the analytics data cache.

11. The computer-implemented method of claim 9, further comprising:
    evaluating a caching policy for the third request to determine that the third analytics data is not to be stored in the analytics data cache,
    wherein transmitting the third analytics data in response to the third request comprises transmitting the third analytics data without storing the third analytics data in the analytics data cache.

12. A computing device, comprising:
    a processor; and
    a non-transitory computer-readable medium having stored thereon instructions that, when executed by the processor, cause the processor to perform operations including:
      receiving a first request for a first analytics data;
      determining that an analytics data cache does not store analytics data responsive to the first request;
      executing a first analytics job to generate the first analytics data responsive to the first request, such that the first analytics data is generated after receiving the first request for the first analytics data, wherein the first analytics data comprises streaming analytics data responsive to the first request;
      storing the first analytics data in the analytics data cache;
      transmitting the first analytics data in response to the first request;
      receiving a second request for a second analytics data;
      determining that the analytics data cache stores the second analytics data responsive to the second request, the second analytics data corresponding at least partly to the first analytics data;
      retrieving the second analytics data from the analytics data cache; and
      transmitting the second analytics data in response to the second request.

13. The computing device of claim 12, wherein retrieving the second analytics data occurs without executing an additional analytics job to obtain new analytics data responsive to the second request.

14. The computing device of claim 12, wherein the first analytics job:
    provides historical analytics data responsive to the first request and having times up to a first time associated with the first request; and provides the streaming analytics data responsive to the first request and associated with times after the first time.

15. The computing device of claim 14, wherein at least a portion of the streaming analytics data is transmitted in response to the second request prior to or concurrent with storing the streaming analytics data to the analytics data cache.

16. The computing device of claim 12, wherein determining that the analytics data cache stores analytics data responsive to the second request includes comparing the second request to the first request to determine one or more parameters of the second request overlap with or are the same as one or more parameters of the first request.

17. A non-transitory computer-readable medium comprising instructions that, when executed by one or more processors, cause the one or more processors to perform operations including:

receiving a first request for a first analytics data;
determining that an analytics data cache does not store analytics data responsive to the first request;
executing a first analytics job to generate the first analytics data responsive to the first request, such that the first analytics data is generated after receiving the first request for the first analytics data, wherein the first analytics data comprises streaming analytics data responsive to the first request;
storing the first analytics data in the analytics data cache;
transmitting the first analytics data in response to the first request;
receiving a second request for a second analytics data;
determining that the analytics data cache stores the second analytics data responsive to the second request, the second analytics data corresponding at least partly to the first analytics data;
retrieving the second analytics data from the analytics data cache; and
transmitting the second analytics data in response to the second request.

18. The non-transitory computer-readable medium of claim 17, wherein retrieving the second analytics data occurs without executing an additional analytics job to obtain new analytics data responsive to the second request.

19. The non-transitory computer-readable medium of claim 17, wherein the first analytics job:

provides historical analytics data responsive to the first request and having times up to a first time associated with the first request; and
provides the streaming analytics data responsive to the first request and associated with times after the first time, wherein at least a portion of the streaming analytics data is transmitted in response to the second request prior to or concurrent with storing the streaming analytics data to the analytics data cache.

20. The non-transitory computer-readable medium of claim 17, wherein determining that the analytics data cache stores analytics data responsive to the second request includes comparing the second request to the first request to determine one or more parameters of the second request overlap with or are the same as one or more parameters of the first request.

* * * * *